(12) United States Patent
Yoo

(10) Patent No.: US 11,760,403 B2
(45) Date of Patent: Sep. 19, 2023

(54) STROLLER

(71) Applicant: Sang Jin Yoo, Seoul (KR)

(72) Inventor: Sang Jin Yoo, Seoul (KR)

( * ) Notice: Subject to any disclaimer, the term of this patent is extended or adjusted under 35 U.S.C. 154(b) by 411 days.

(21) Appl. No.: 17/034,125

(22) Filed: Sep. 28, 2020

(65) Prior Publication Data

US 2021/0101634 A1 Apr. 8, 2021

(30) Foreign Application Priority Data

Oct. 7, 2019 (KR) .......................... 10-2019-0124186

(51) Int. Cl.
| | | |
|---|---|---|
| *B62B 9/12* | (2006.01) | |
| *B62K 13/04* | (2006.01) | |
| *B62B 9/28* | (2006.01) | |
| *B62B 7/04* | (2006.01) | |
| *B62B 7/06* | (2006.01) | |

(Continued)

(52) U.S. Cl.
CPC ............... *B62B 9/12* (2013.01); *B62B 7/044* (2013.01); *B62B 7/046* (2013.01); *B62B 7/068* (2013.01); *B62B 7/10* (2013.01); *B62B 7/14* (2013.01); *B62B 9/08* (2013.01); *B62B 9/28* (2013.01); *B62K 13/00* (2013.01); *B62K 13/04* (2013.01); *A63C 2203/06* (2013.01); *B62B 7/12* (2013.01); *B62B 9/203* (2013.01); *B62K 3/002* (2013.01)

(58) Field of Classification Search
CPC ....... B62B 2206/006; B62B 7/12; B62B 7/14; B62B 9/12; B62B 9/28; B62B 5/0433
See application file for complete search history.

(56) References Cited

U.S. PATENT DOCUMENTS

| | | | | |
|---|---|---|---|---|
| 3,485,507 A | * | 12/1969 | Christof | ................... B62K 9/02 |
| | | | | 280/47.11 |
| 5,647,601 A | * | 7/1997 | Potter | ....................... B62B 7/00 |
| | | | | 280/47.38 |

(Continued)

FOREIGN PATENT DOCUMENTS

| | | | | | |
|---|---|---|---|---|---|
| CN | 105946948 A | * | 9/2016 | ............... | B62B 7/06 |
| CN | 107097832 A | * | 8/2017 | ............... | B62B 7/06 |

(Continued)

*Primary Examiner* — Emma K Frick
(74) *Attorney, Agent, or Firm* — KORUS Patent, LLC; Seong Il Jeong

(57) ABSTRACT

The present disclosure relates to a stroller comprising: a sheet portion including a sheet; a support frame including an upper support frame supporting the sheet, a lower support frame rotatably connected to the upper support frame by a hinge portion, and a frame support that maintains a fixed state between the upper support frame and the lower support frame; and a moving structure to which the support frame is detachably connected, the moving structure including a guide frame that allows the lower support layer to fold and support and is extended in the length direction, a drive frame including a rear wheel coupling portion having a front wheel coupling portion connected in a '¬' shape to the front part of the guide frame and a rear wheel coupling portion having coupling shaft portions formed on both sides of the rear end of the guide frame, a front wheel supported by a support fork to be installed on the front wheel coupling portion, and a rear wheel installed on the rear wheel coupling portion through a rear wheel connecting shaft.

17 Claims, 11 Drawing Sheets

(51) Int. Cl.
*B62B 9/08* (2006.01)
*B62K 13/00* (2006.01)
*B62B 7/10* (2006.01)
*B62B 7/14* (2006.01)
*B62B 9/20* (2006.01)
*B62K 3/00* (2006.01)
*B62B 7/12* (2006.01)

(56) References Cited

U.S. PATENT DOCUMENTS

| | | | | |
|---|---|---|---|---|
| 6,764,133 | B2 * | 7/2004 | Osato | B62B 9/26 |
| | | | | 297/184.13 |
| 7,364,182 | B2 * | 4/2008 | Jane Santamaria | B62B 7/10 |
| | | | | 280/47.38 |
| 7,832,755 | B2 * | 11/2010 | Nolan | B62B 7/068 |
| | | | | 280/47.38 |
| 8,083,240 | B2 * | 12/2011 | Jacobs | B62B 9/18 |
| | | | | 280/47.38 |
| 8,336,904 | B2 * | 12/2012 | Kylstra | A61G 5/08 |
| | | | | 280/647 |
| 9,789,893 | B2 * | 10/2017 | Young | B62K 13/04 |
| 10,442,490 | B2 * | 10/2019 | Baron | B62B 7/12 |
| 11,161,539 | B2 * | 11/2021 | Day | B62B 7/12 |
| 2009/0194957 | A1 * | 8/2009 | Schneegans | B62B 7/10 |
| | | | | 280/31 |
| 2015/0021877 | A1 * | 1/2015 | Kim | B62B 7/142 |
| | | | | 280/282 |
| 2020/0391782 | A1 * | 12/2020 | Yoo | B62B 7/044 |

FOREIGN PATENT DOCUMENTS

| | | | | |
|---|---|---|---|---|
| CN | 211869484 | U | * | 11/2020 |
| DE | 1605870 | A1 | | 1/1971 |
| KR | 200413288 | Y1 | * | 4/2006 |
| KR | 10-2009-0091548 | A | | 8/2009 |
| KR | 10-2009-0129335 | A | | 12/2009 |
| KR | 10-2031279 | B1 | | 10/2019 |
| KR | 102158937 | B1 | * | 9/2020 |
| WO | WO-2016153093 | A1 | * | 9/2016 | ............ B62B 7/12 |

* cited by examiner

STROLLER

CROSS-REFERENCE TO RELATED APPLICATION(S)

This application claims the benefit of Korean Patent Application No. 10-2019-0124186 filed on Oct. 7, 2019 with the Korean Intellectual Property Office, the disclosure of which is incorporated herein by reference in its entirety.

BACKGROUND OF THE INVENTION

(a) Field of the Invention

The present disclosure relates to a stroller and, more particularly, to a stroller having a moving structure that allows conversion to a bicycle or a kickboard.

(b) Description of the Related Art

In general, when walking or going out with preschool children including babies and toddlers, the most basic thing they need may be a stroller. However, the stroller has a basic structure in which a wheel is coupled to a lower portion and a seat is coupled to a central portion of a frame with a handle on the upper portion, and a storage body capable of easily storing lightweight and small articles such as children's products may be provided in the lower part of the frame located under the seat.

Strollers are divided into a stroller with a fixed frame or a stroller with a foldable frame based on the above structure. The stroller with a fixed frame is limited in use because it can be used for stroller purposes only, so there is a disadvantage that its utility is deteriorated.

In addition, a stroller with a foldable frame occupies a lot of space because the folding structure is complicated or the folding structure is bulky. Further, it is not easy to carry a stroller in a passenger car or fold and store it when not in use, and there was a problem that it is stored or left in an unfolded state.

Meanwhile, as the use period of the stroller is shortened, the stroller is not discarded due to a breakdown, etc., but in most cases, the stroller is discarded after elapse of the age of use of the stroller, even though it is almost new. Therefore, there is a problem that serious resource waste and environmental pollution are caused by such discarded or unused strollers.

PRIOR ART LITERATURE

Patent Literature

Korean Unexamined Patent Publication No. 2009-0129335 (published on Dec. 16, 2009)

SUMMARY OF THE INVENTION

Technical Problem

Therefore, the present disclosure has been designed to solve the above-mentioned problems, and it is therefore an object of the present disclosure to provide a stroller having a moving structure that allows conversion to a bicycle or kickboard.

It is another object of the present disclosure to provide a stroller that can be easily folded by a single operation.

Technical Solution

The stroller according to an embodiment of the present disclosure comprises: a seat portion including a seat; a support frame including an upper support frame supporting the seat, a lower support frame rotatably connected to the upper support frame by a hinge portion, and a frame support that maintains a fixed state between the upper support frame and the lower support frame; and a moving structure to which the support frame is detachably connected, the moving structure including a guide frame that allows the lower support layer to fold and support and is extended in the length direction, a drive frame including a rear wheel coupling portion having a front wheel coupling portion connected in a '¬' shape to the front part of the guide frame and a rear wheel coupling portion having coupling shaft portions formed on both sides of the rear end of the guide frame, a front wheel supported by a support fork to be installed on the front wheel coupling portion, and a rear wheel installed on the rear wheel coupling portion through a rear wheel connecting shaft.

According to an embodiment of the present disclosure, the lower support frame includes a first frame rotatably connected to the upper support frame by a hinge portion, and a second frame rotatably hinged to the first frame, and the second frame is slidably mounted on the guide frame and supported to be foldable with respect to the first frame.

According to an embodiment of the present disclosure, the guide frame includes a moving guide groove to guide: a first guide portion extending in the length direction and receiving a roller to be movable in the front-rear direction therein, a second guide portion coupled to the first guide portion, and a joint portion having a coupling sleeve to which the second frame of the lower support frame and the roller are coupled.

According to an embodiment of the present disclosure, the support fork is formed in the form of a module in which the front wheel is connected, and is detachably coupled to the upper end part of the front wheel coupling part, and the support fork includes a pair of support fork portions, so that a pair of front wheels are installed.

According to an embodiment of the present disclosure, the frame support is installed between the upper support frame and the first frame of the lower support frame, and a locking device slidably mounted on the upper support frame is provided on the upper end, and in response to the unlocking of the locking device, the upper end of the frame support moves along the upper support frame.

According to an embodiment of the present disclosure, the stroller includes a frame connecting mechanism which is installed on the rear wheel connecting shaft and to which the first frame of the lower support frame is fixed.

According to an embodiment of the present disclosure, the frame connecting mechanism includes a rear wheel locking portion inserted and installed into the rear wheel connecting shaft and connected to the rear wheel to lock the rear wheel, and a suspension that is formed integrally with the rear wheel locking portion, is coupled to the lower end of the first frame, and supports the first frame in a buffer manner.

According to an embodiment of the present disclosure, the rear wheel connecting portion includes: a first shaft extending between the coupling shaft portions, and having both ends extending outward through the center of the coupling shaft portion; a brake wheel rotatably installed on the first shaft; and a pressing plate hingedly connected to the guide frame, disposed at the upper portion of the brake wheel, and selectively contacting the brake wheel to enable braking of the brake wheel.

According to an embodiment of the present disclosure, the rear wheel connecting shaft has a shaft coupling portion integrally coupled with the coupling shaft portion at one side end, and has a second shaft rotating at the other side end, and the rear wheel is coupled to the second shaft.

According to an embodiment of the present disclosure, the rear wheel connecting shaft includes a shaft coupling portion integrally rotatably coupled with the first shaft at one side end, and a second shaft integrally rotating with the shaft coupling portion at the other side end, and in which the rear wheel is coupled to the second shaft.

According to an embodiment of the present disclosure, the upper frame is divided into two and foldably connected by a hinge portion, and a handle provided at the upper end portion of the upper frame is provided with a lever for controlling the rotation of the hinge portion of the divided portion.

According to an embodiment of the present disclosure, the upper end portion of the drive frame is provided with a handle coupling portion to which a handle enabling steering of the support fork can be coupled.

According to an embodiment of the present disclosure, the moving structure further includes a saddle frame coupled to the drive frame in a state in which the support frame is separated, and a saddle coupled to the saddle frame, the support fork further includes a footboard connected to the central axis of the front wheel, and the handle is coupled to the handle coupling portion, and can be used as a three-wheeled bicycle.

According to an embodiment of the present disclosure, the saddle frame includes a horizontal plate and a vertical plate hingedly connected to the horizontal plate, and is formed in a form that can be folded and stored when not in use.

According to an embodiment of the present disclosure, the moving structure is configured such that the rear wheel is directly connected to the rear wheel connecting portion of the drive frame in a state in which the support frame is separated, the rear wheel is installed to rotate together with the first shaft, and the handle is coupled to the handle coupling portion, and thus can be used as a kickboard.

According to an embodiment of the present disclosure, it further includes a kickboard footboard fitted to the guide frame.

According to an embodiment of the present disclosure, the handle has a multi-stage steering shaft capable of height adjustment at a lower end, and a lower end of the steering shaft is coupled to the handle coupling portion.

According to an embodiment of the present disclosure, the handle includes a grip portion formed to be adjustable in length at both ends, a handle fixing portion is formed in the seat portion so that the handle is fixed and used safely, and the handle is coupled to the handle fixing portion or the handle coupling portion.

Advantageous Effects

In the stroller according to the present disclosure having the configuration as described above, the moving structure of the stroller has a drive frame that can be a frame of a bicycle or a kickboard, and thereby, the stroller can be converted into a bicycle or a kickboard. Therefore, when a child passes the age of use of the stroller, the stroller can be used as a three-wheeled bicycle or a kickboard without discarding it, thereby reducing costs as well as saving resources.

In addition, according to the present disclosure, there is an effect that can be easily folded and stored when used as a stroller.

DETAILED DESCRIPTION OF THE EMBODIMENTS

Figure 1:
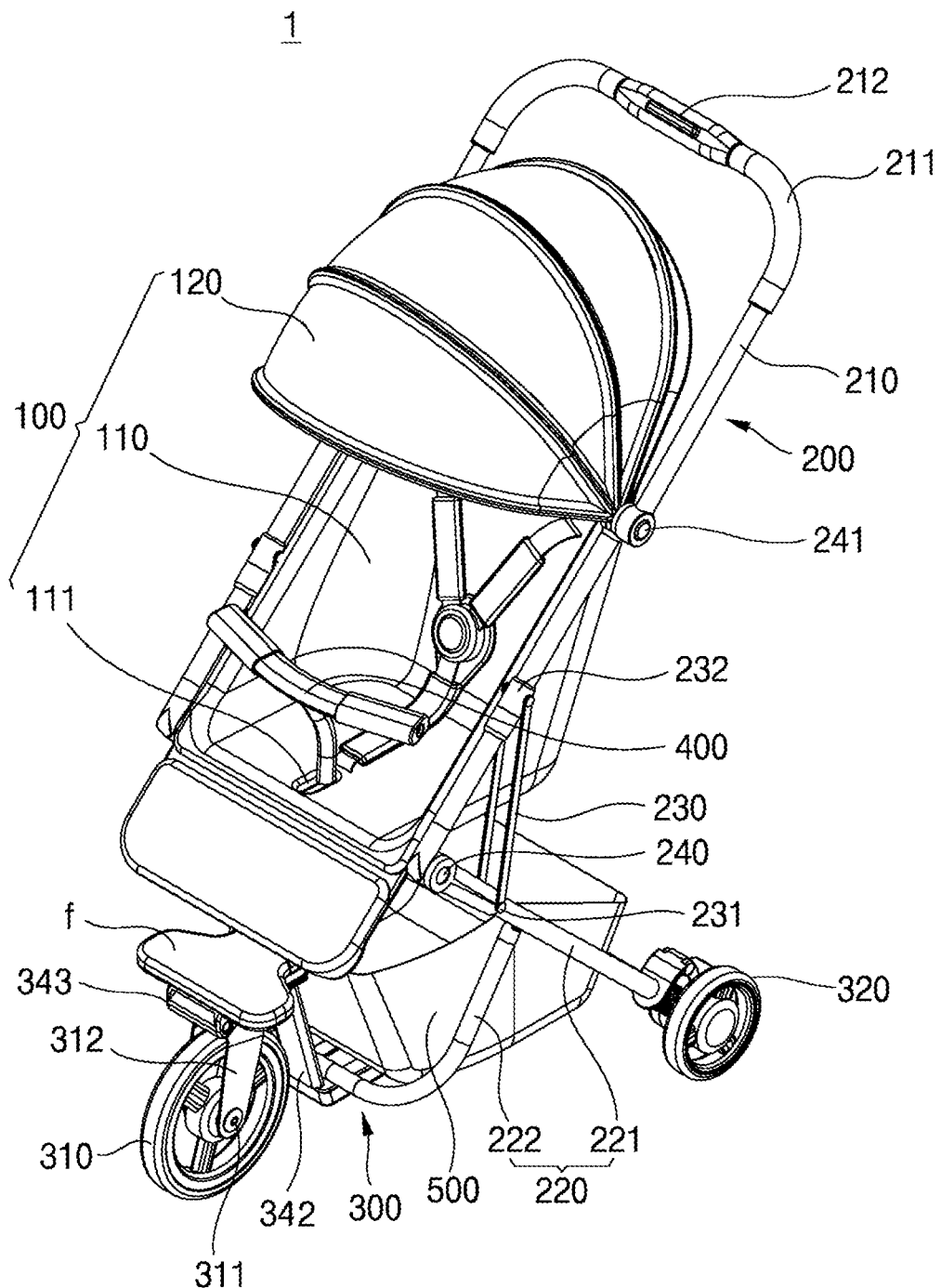
FIG. 1 is a perspective view showing a stroller according to the present disclosure.

Since various modifications may be made to the present disclosure and the present disclosure may have various forms, specific embodiments will be illustrated and described in detail below. However, it should be understood that the present disclosure is not limited to specific disclosed forms, and the present disclosure includes all changes, equivalents and substitutions falling within the spirit and technical scope of the present disclosure. In describing the drawings, like reference numerals are used for like elements.

The terms are used only to discriminate one constituent element from another component. Terms used herein are used only to describe specific embodiments, and are not intended to limit the present disclosure. A singular form may include a plural form if there is no clearly opposite meaning in the context.

Hereinafter, embodiments of the present disclosure will be described with reference to the accompanying figures.

Figure 2:
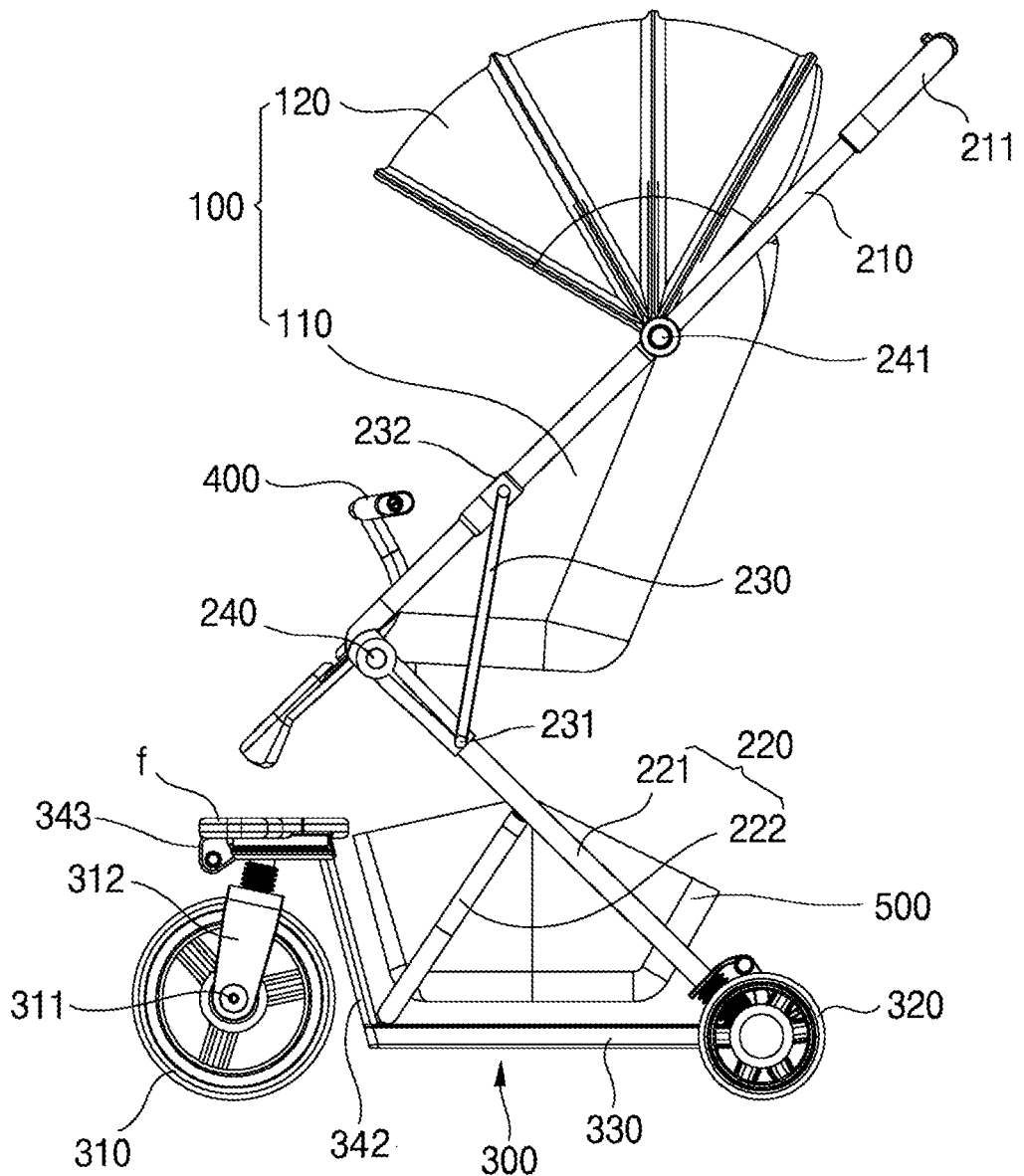
FIG. 2 is a side view showing a stroller according to the present disclosure.

FIG. 1 is a perspective view showing a stroller according to the present disclosure, and FIG. 2 is a side view showing a stroller according to the present disclosure.

As shown in FIGS. 1 and 2, the stroller 1 according to the present disclosure includes a seat portion 100, a support frame 200, and a moving structure 300.

The seat portion 100 is formed so that infants can ride on it. The seat portion 100 may include a seat 110 and a sun shade 120.

The seat 110 is a part where infants ride and may be formed of a fabric material. A handle fixing portion 111 for fixing a handle 400 may be formed on the lower side of the seat 110. The handle fixing portion 111 may be coupled to and fixed to the lower end of the upper support frame 210. The handle 400 is coupled to the handle fixing portion 111 through a hole formed in the bottom surface of the seat 110, and the handle 400 is detachably coupled to the handle fixing portion 111. When used as a stroller 1, the handle 400 is disposed together with the seat 110 and used as a safety bar, and when converted to the bicycle 2 or the kickboard 3, it can be separated from the handle fixing part 111 and connected to the front wheel coupling part 342 of the drive frame 330 for steering.

The sun shade 120 is detachably installed on the seat 110 and is formed so as to block sunlight and rain and so protect the infant.

The support frame 200 includes an upper support frame 210, a lower support frame 220, and a frame support 230.

The support frame 200 is coupled to the moving structure 300 at the lower end portion and provided with a handle 211 at the upper end portion to support the seat 110. The support frame 200 is detachably coupled to the moving structure 300.

The upper support frame 210 has an inverted 'U' shape in which the handle 211 is provided at the upper end portion, and supports the seat 110 from both sides.

The lower support frame 220 is hingedly connected to the upper support frame 210 via a hinge portion 240, and the moving structure 300 is coupled to the lower end portion.

The hinge portion 240 is installed on a shaft in which both sides of the lower end portion of the upper support frame 210 and both sides of the upper end portion of the lower support frame 220 are mutually coupled and shared, and rotatably connects the upper support frame 210 and the lower support frame 220. By the hinge portion 240, the upper support frame 210 can be folded with respect to the lower support frame 220, and can adjust the angle of the upper support frame 210.

The frame support 230 may be installed so as to be supported between the upper support frame 210 and the lower support frame 220. The frame support 230 is formed so as to maintain a fixed state between the upper support frame 210 and the lower support frame 220. The lower end of the frame support 230 is rotatably supported by a hinge 231 on the lower support frame 220, and the other side is installed to be slidably moved along the length direction of the upper support frame 210.

The frame support 230 has a locking device 232 at the upper end, which is a part that is coupled with the upper support frame 210. During the operation of the stroller 1, the frame support 230 is kept in a fixed state with respect to the upper support frame 210 by locking a locking device 232. On the other hand, when the stroller 1 is folded, the locking device 232 is unlocked so that the frame support 230 slidably moves along the upper support frame 210, and the upper support frame 210 can be rotated with respect to the first frame 221 based on the hinge portion 240, so that it can be folded. The locking device 232 is a locking means that is locked or unlocked with respect to the upper support frame 210, and various types of locking devices may be adopted and used.

The lower support frame 220 according to the present disclosure includes a first frame 221 and a second frame 222.

The first frame 221 is rotatably connected to the upper support frame 210 by a hinge part 240, and the lower side is connected on the rear wheel connecting shaft 321 which axially connects the rear wheel 320. A frame connecting mechanism 322 for fixing the lower end of the first frame 221 may be provided on the rear wheel connecting shaft 321.

The second frame 222 is hingedly connected so that the upper side is rotatable with respect to the middle portion of the first frame 221, and the lower side is installed so as to be supported movably on the guide frame 331 of the moving structure 300.

The support frame 200 configured in this way is configured so as to be foldable with respect to the moving structure 300 in a state in which the seats 110 are coupled together.

Figure 3:
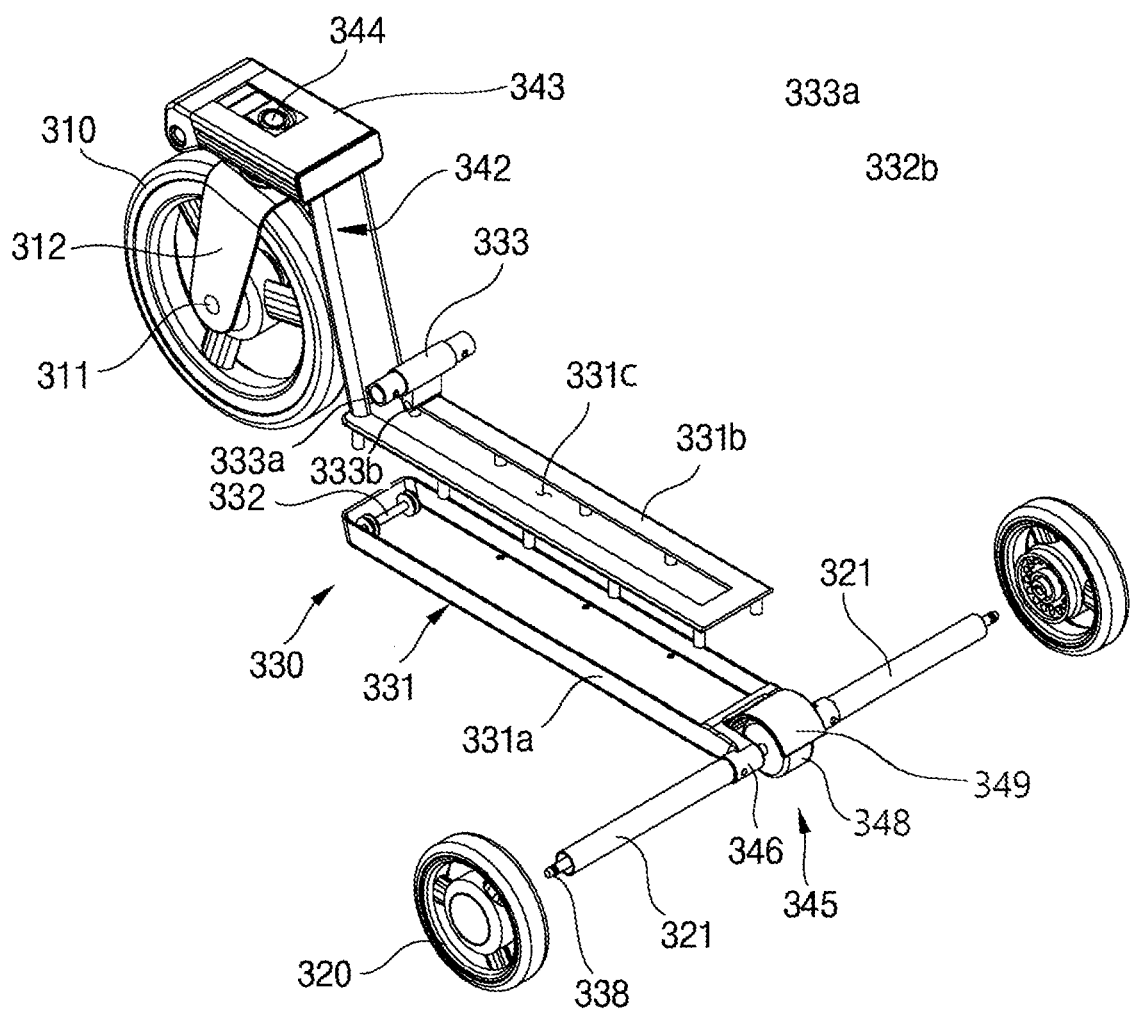
FIG. 3 is an exploded perspective view for explaining a moving structure according to the present disclosure.
Figure 4:
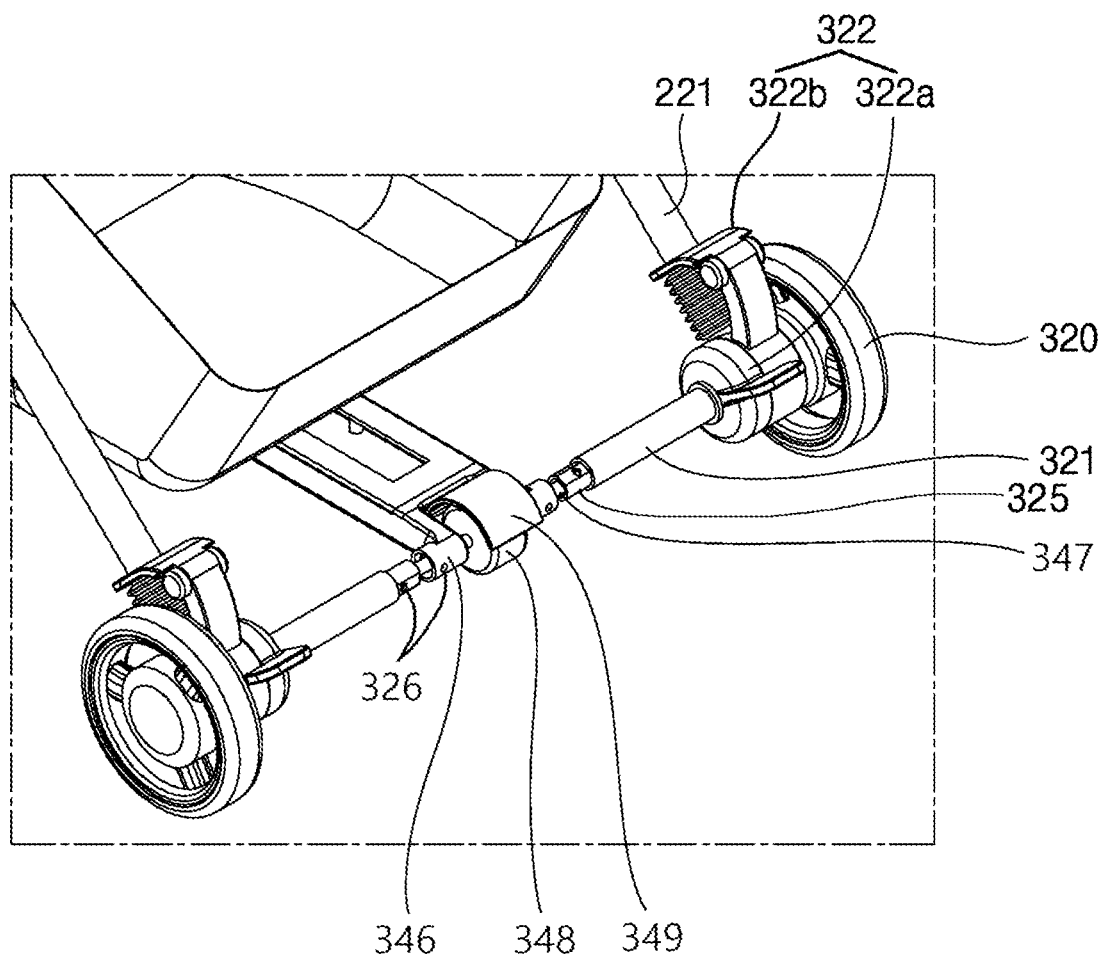
FIG. 4 is an exploded perspective view showing a coupled state of the rear wheel connecting shaft and the rear wheel connecting shaft in the moving structure of the stroller according to the present disclosure.

Meanwhile, the upper support frame 210 is divided into two and formed so as to be foldable. The hinge portion 241 may be formed at the divided portion. The handle 211 is provided with a lever 212 that controls the rotation of the hinge portion 241 at the divided portion. By operating the lever 212, the upper and lower parts of the upper support frame 210 are foldable with respect to each other, FIG. 3 is an exploded perspective view showing a moving structure 300 of the scroller according to the present disclosure and is shown in a state where the frame connecting mechanism 322 is omitted. FIG. 4 is an exploded perspective view showing a coupled state of the rear wheel connecting shaft and the rear wheel connecting shaft in the moving structure of the stroller according to the present disclosure.

The moving structure 300 will be described with reference to FIGS. 3 and 4.

The moving structure 300 is a part that supports and moves the support frame 220 of the scroller 1.

According to an embodiment of the present disclosure, the moving structure 300 of the scroller 1 includes a drive frame 330, and a front wheel 310 and a rear wheel 320 coupled to the drive frame 330. The drive frame 330 may be a frame of a bicycle 2 or a kickboard 3.

The drive frame 330 includes a guide frame 331 that supports the support frame 200 and extends in the length direction, a front wheel coupling portion 342 to which the front wheel 310 is connected, and a rear wheel coupling portion 345 to which the rear wheel 320 is connected.

The guide frame 331 supports so as to slidably move the second frame 222 of the lower support frame 220 along the length direction of the guide frame 331. The guide frame 331 has a roller 332 therein, and a second frame 222 is connected to the roller 332 to move in the length direction of the guide frame 331. The movement of the second frame 222 by the roller 332 is related to an operation in which the support frame 200 of the scroller is folded with respect to the moving structure 300.

In addition, a basket 500 capable of storing an article when used as a stroller 1 may be placed on the guide frame 331.

Referring to FIG. 3, the guide frame 331 includes a first guide portion 331a and a second guide portion 331b.

The first guide portion 331a extends in the length direction, and the roller 332 is housed therein so as to be movable in the front-rear direction.

The second guide portion 331b is detachably mounted to the first guide part 331a. The second guide portion 331b is formed of a plate-shaped member coupled to the upper portion of the first guide portion 331a. The guide frame 331 includes a joint portion 333 that connects the roller 332 and the second frame 222. A moving guide hole 331c is formed on the upper surface of the second guide part 331b to guide the movement of the joint portion 333 coupled with the roller 332 disposed on the first guide part 331a.

The joint portion 333 includes a first coupling sleeve 333a to which the second frame 222 is coupled to an upper end, and a second coupling sleeve 333b to which the rollers 332 installed on the first guide portion 331a are coupled to the lower end. The second frame 222 and the roller 332 are integrally coupled to each other by the joint portion 333 to operate integrally. Accordingly, the second frame 222 of the lower support frame 220 may slidably move along the guide frame 331 in the front-rear direction.

In an embodiment according to the present disclosure, the moving guide hole 331c is illustrated as being formed on the upper surface of the second guide part 331b, without being limited thereto, and may be formed as a side surface of the first guide part 331a. At this time, the coupling sleeve 333b coupled with the second frame 222 of the joint portion 333 may be formed to correspond to the moving guide hole 331c formed on the side surface of the first guide portion 331a.

The drive frame 330 includes a front wheel coupling portion 342. The front wheel coupling portion 342 is provided in the front part of the guide frame 331 to support the front wheel 310.

The front wheel coupling portion 342 is formed in a '¬' shaped frame, extends to an upper portion so as to be inclined from the front stage of the guide frame 331, and includes an upper end portion 343 to which a support fork 312 supporting the front wheel 310 is coupled.

The front wheel 310 is connected to the upper end portion 343 in a state of being coupled to the support fork 312. The support fork 312 rotatably supports the front wheel 310.

The upper end 343 is provided with a handle coupling portion 344 to which the handle 400 is coupled.

The handle coupling portion 344 is a portion extending from the support fork 312, and is coupled to the handle 400 to enable steering of the front wheel 310. The handle coupling portion 344 may be formed in the form of a coupling hole formed in the shaft portion of the support fork 312. The handle 400 is coupled when converting the moving structure 300 of the stroller 1 according to the present disclosure into a bicycle 2 or a kickboard 3. According to an embodiment of the present disclosure, the handle 400 may be a handle 400 separated from the seat portion 100 of the stroller. The handle 400 is detachably coupled to the handle coupling portion 344.

Figure 5:
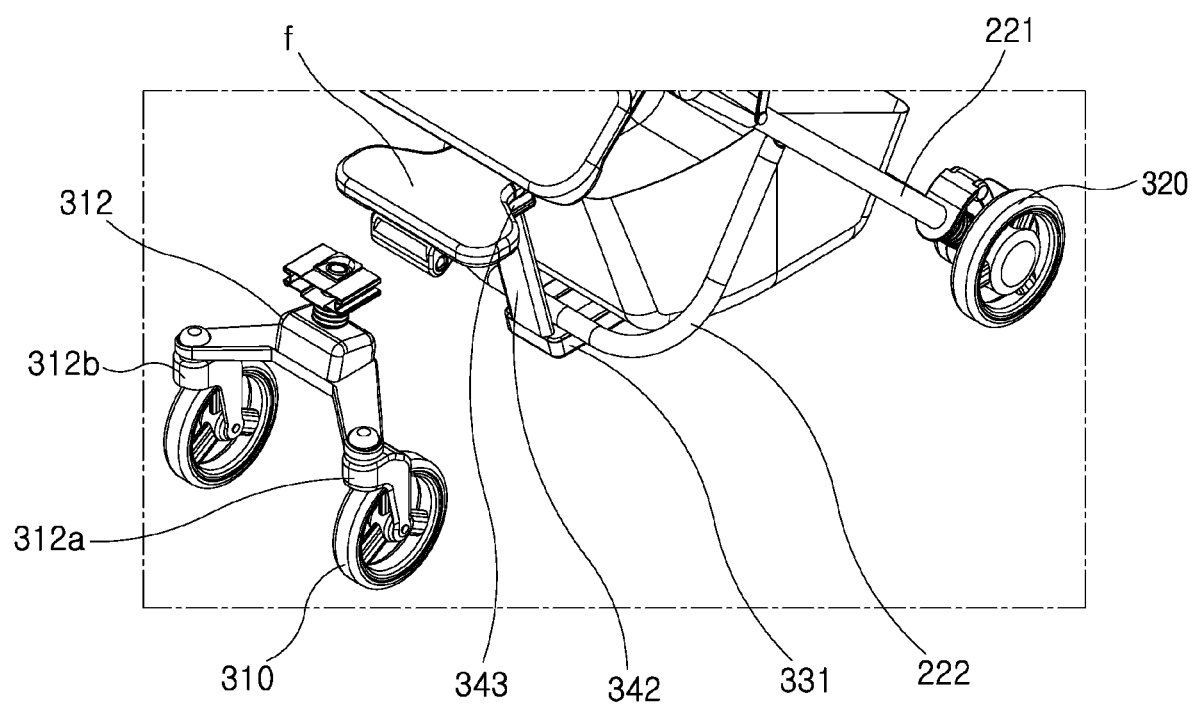
FIG. 5 is a view for explaining a support fork according to the present disclosure.

In FIGS. 1 to 3, the support fork 312 is shown in the form of a module having one front wheel 310, but is not necessarily limited thereto, and as shown in FIG. 5, it may be a module having a pair of front wheels 310. As shown in FIG. 5, the support fork 312 has a pair of support fork portions 312a and 312b, and the front wheel 310 may be coupled to each of the support fork portions 312a and 312b.

According to an embodiment of the present disclosure, the support fork 312 may be detachably coupled to the upper end portion 343 in the form of a module coupled with the front wheel 310. For example, the support fork 312 may be detachably coupled to the upper end portion 343 through a groove formed in the front part of the upper end portion 343.

FIG. 3 shows a state in which a support fork 312 in the form of a module having one front wheel 310 is inserted and coupled to the upper end 343. When trying to convert to a form having a pair of front wheels 310, the support fork 312 shown in FIG. 3 is separated from the upper end 343, and the support fork 312 in the form of a module having a pair of front wheels 310 shown in FIG. 5 may be inserted and coupled to the upper end 343.

As shown in FIGS. 1 and 2, in the stroller 1 according to the embodiment of the present disclosure, the footboard f may be coupled to the upper end 343 of the front wheel coupling portion 342. For this purpose, a fastening portion (not shown) for fixing the footboard f may be formed at the upper end 343. The footboard f is formed so that the foot of the infant can be placed in the stroller 1. When converting a stroller 1 into a three-wheeled bicycle 2 and a kickboard 3, the footboard f is not used in the three-wheeled bicycle 2 and the kickboard 3, and thus, the footboard f is separated. As will be described later, the footboard f can be used as a saddle (s) in the three-wheeled bicycle 2.

As shown in FIGS. 3 and 4, a rear wheel coupling portion 345 for connecting the rear wheel 320 is formed at the rear end of the guide frame 331.

The rear wheel coupling portion 345 includes a coupling shaft portion 346 formed on both sides at the rear end of the guide frame 331. The rear wheel 320 may be coupled to the coupling shaft portion 346 via the rear wheel connecting shaft 321, or may be directly coupled to the rear wheel 320.

According to an embodiment of the present disclosure, the rear wheel coupling portion 345 includes a cylindrical brake wheel 348 rotatably installed by the first shaft 347, and a pressing plate 349 installed on the upper portion of the brake wheel 348.

The brake wheel 348 is installed integrally with the first shaft 347 between the coupling shaft portions 346 on both sides. The first shaft 347 extends between the coupling shaft portions 346 on both sides, and the both ends extend outwardly through the center of the coupling shaft portion 346. The first shaft 347 is coupled so as to operate together with the brake wheel 348.

The pressing plate 349 is formed to be bent along the upper portion of the brake wheel 348 and is hingedly coupled to the guide frame 331 at the rear end. The pressing plate 349 is elastically supported in a direction away from the brake wheel 348. Therefore, only when the user presses the pressure plate 349, it contacts the brake wheel 348 to perform braking. A friction plate (not shown) may be attached to the inside of the pressing plate 349, that is, on a surface facing the brake wheel 348 in order to improve a braking force. When the pressing plate 349 moves downward, a friction force is generated between the pressing plate 349 and the brake wheel 348 to perform braking. Since the brake wheel 348 rotates together with the first shaft 347, when a braking force is applied to the brake wheel 348, a braking force is also applied to a portion coupled to operate with the first shaft 347.

The brake wheel 348 and the pressing plate 349 form a foot brake device to enable stable braking.

According to an embodiment of the present disclosure, the rear wheel 320 in the stroller 1 is coupled to a rear wheel connecting shaft 321 and a frame connecting mechanism 322.

The rear wheel connecting shaft 321 is coupled to each of the coupling shaft portions 346 on both sides. A first shaft 347 penetrating the center of the brake wheel 348 extends to the coupling shaft portion 346 formed at both ends from the rear side of the guide frame 331. A rear wheel connecting shaft 321 is coupled to each of the first shafts 347 extending outwardly through the center of the coupling shaft portion 356. The rear connecting shaft 321 is coupled when the moving structure 300 is used for a stroller 1 and a three-wheeled bicycle 2.

The wheel connecting shaft 321 has a shaft coupling portion 325 coupled to the coupling shaft portion 346 on one side, and has a second shaft 338 coupled to the rear wheel 320 on the other side. The coupling shaft portion 346 and the shaft coupling portion 325 inserted into the coupling shaft portion 346 may be formed with a fastening hole 326 that can be integrally fastened through a fastening member such as a bolt. Bolts can be fastened and fixed in a state where the shaft coupling portion 325 and the coupling shaft portion 336 of the rear wheel connecting shaft 321 are recession/projection-fitted and the fastening holes are matched. At this time, the second shaft 338 is connected so as to rotate together with the first shaft 347.

The second shaft 338 is supported and rotated in the rear wheel connecting shaft 321 by a shaft supporting means (not shown) such as a bearing.

As shown in FIG. 4, the frame connecting mechanism 322 is installed on one side of the rear wheel connecting shaft 321. The first frame 221 of the lower support frame 220 is supported on the rear wheel connecting shaft 321 by a frame connecting mechanism 322.

The frame connecting mechanism 322 is inserted and installed into the suspension 322b and the rear wheel connecting shaft 321 for supporting the lower end of the first frame 221 in a bufferable manner, and includes a rear wheel locking portion 322a that can be coupled to the rear wheel 320 to lock the rear wheel 320.

The suspension 322b is integrally formed with the rear wheel locking portion 322a, and is formed so that the lower end of the first frame 221 can be fixed. The suspension 322b may be provided with a fixing means for preventing the first frame 221 from being arbitrarily detached in a state of being inserted.

The rear wheel locking portion 322a includes a locking lever, and is configured so that the rear wheel 320 can be locked by the operation of the locking lever. The rear wheel locking portion 322a is used in a known stroller.

The stroller 1 according to the embodiment of the present disclosure may convert the moving structure 300 into a bicycle 2 or a kickboard 3 in a state in which the seat portion 100 and the support frame 200 are separated. At this time, the drive frame 310 becomes the frame of the bicycle 2 or the kickboard 3, and some components of the moving structure 300 may be separated, moved, coupled, or added. Such a conversion method will be described below with reference to FIGS. 6 to 10.

Figure 6:
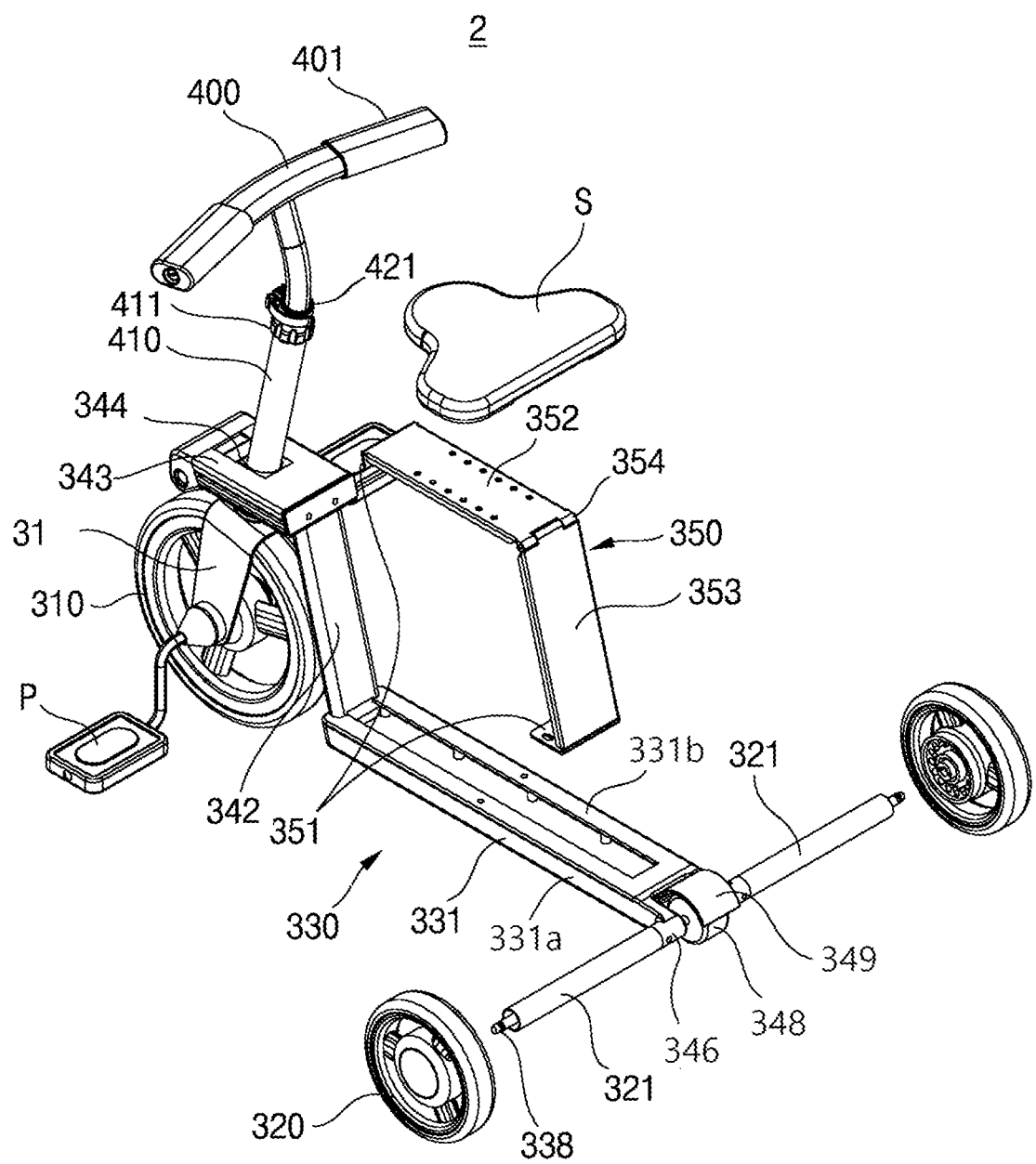
FIG. 6 is an exploded perspective view showing a state in which the moving structure of the stroller according to the present disclosure is converted into a three-wheeled bicycle.

FIG. 6 is an exploded perspective view for explaining a process of converting the moving structure of the stroller 1 according to the present disclosure into a three-wheeled bicycle 2.

Referring to FIG. 6, in order to convert the stroller 1 into a three-wheeled bicycle 2, first, the seat portion 100 and the support frame 200 are separated and removed from the moving structure 300.

When removing the support frame 200 from the moving structure 300, a roller 332 and a joint portion 333 supporting the second frame 222 to be movable with respect to the guide frame 331, and a frame connecting mechanism 322 connecting the first frame 221 to the rear wheel connecting shaft 321 can be removed together.

As shown in FIG. 6, the moving structure 300 for a bicycle includes a drive frame 320, a front wheel 310 coupled and installed to the support fork 312 to the front wheel coupling portion 342, and a rear wheel 320 that is connected and installed to the rear wheel coupling portion 345 by the rear wheel connecting shaft 312. Compared with the moving structure 300 for the stroller 1, it is a state in which the roller 332, the joint portion 333, and the frame connecting mechanism 322 are removed.

For conversion to a three-wheeled bicycle 2, the handle 400 is connected to the handle coupling portion 344 provided at the upper end portion 343 of the front wheel coupling portion 342.

According to an embodiment of the present disclosure, the handle 400 may be coupled to the handle coupling portion 344 in a state in which the steering shafts 410 and 420 are coupled on the lower side. When used as a stroller 1, the handle 400 is fixed to the handle fixing portion 111 and disposed on the seat portion 100. When used as a bicycle 2, the handle 400 is separated from the handle fixing portion 111 and the steering shafts 410 and 420 are coupled to the handle coupling part 344 in a state of being connected to the lower end.

The steering shafts 410 and 420 are coupled to the support fork 312 via the handle coupling portion 344, and steering of the current 310 is made possible by a handle 400.

The steering shafts 410 and 420 may be multi-stage steering shafts such that the plurality of steering shafts 410 and 420 are length adjusted. One steering shaft 420 may be inserted or pulled out into another adjacent steering shaft 410, so that the length can be adjusted in multiple stages. For example, the steering shafts 410 and 420 with different diameters are applied, but one steering shaft 410 forms a first fixing portion 411 on the upper end to enable length adjustment of the other steering shaft 420. The other steering shaft 420 also forms a second fixing portion 421 on the upper end portion to enable the insertion depth of the handle 400. The first fixing portion 411 and the second fixing portion 421 are locking means that are fixed or released, and various locking means may be adopted and used.

Pedals p are installed on the front wheel central shaft 311 that supports the front wheel 310 on both sides of the support fork 312. The pedal (p) becomes a means for rotating the front wheel 310 when using the moving structure 300 as a three-wheeled bicycle.

Figure 7:
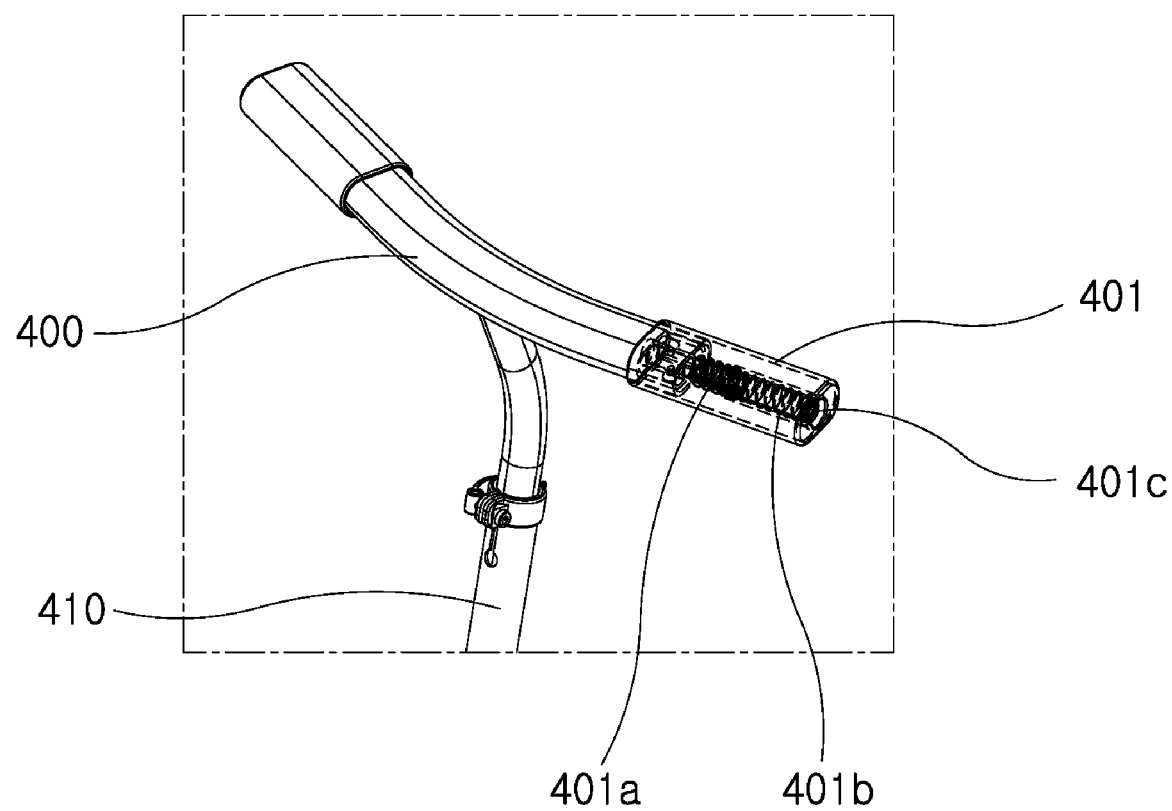
FIG. 7 is a view for explaining a handle according to the present disclosure.

According to an embodiment of the present disclosure, the handle 400 includes a grip portion 401 formed to be adjustable in length. FIG. 7 is a view for explaining the coupling relationship of the grip portion 401 in the handle 400 according to an embodiment of the present disclosure.

Referring to FIG. 7, a bolt portion 401a supported by the body of the handle 400 is provided inside the grip portion 401, a nut part 401b corresponding to the bolt portion is provided inside of the grip part 401, and a bolt groove 401c for length adjustment is provided at an outer end of the grip part 401. By turning the bolt groove 401c formed at the end of the grip portion 401, the length of the grip part 401 protruding toward both sides of the handle 400 may be adjusted. When the handle 400 is used as a safety bar in a stroller, the protruding length of the grip portion 401 is adjusted to the maximum short length, and when the handle 400 is used for steering a bicycle or a kickboard, the protruding length of the grip part 401 can be adjusted to the maximum length.

In the embodiment of the present disclosure, the grip portion 401 of the handle 400 is formed to be adjustable in length, to thereby allow the handle 400 to be used in common in the stroller 1, the bicycle 2, and the kickboard 3.

According to an embodiment of the present disclosure, the moving structure 300 of the bicycle 2 includes a saddle frame 350. The saddle frame 350 is coupled to the drive frame 330. The saddle frame 350 is separated and stored separately when the moving structure 300 is used as a moving means of the stroller 1, and is coupled to the drive frame 330 when used as a bicycle 2.

The saddle frame 350 may have a horizontal plate 352 and a vertical plate 353 having a predetermined length, and may be formed in an a '¬' shape. The horizontal plate 352 and the vertical plate 353 are connected to each other by a hinge 354.

The saddle frame 350 includes a coupling flange 351 for coupling with the drive frame 330. A coupling flange 351 coupled to the side of the front wheel coupling portion 342 is formed at the end portion of the horizontal plate 352, and a coupling flange 351 coupled to the guide frame 331 is formed at the end of the vertical plate 352. The coupling flange 351 has a fastening hole, and the drive frame 330 has a fastening hole at a portion that is coupled with the coupling flange 351.

Since the horizontal plate 352 and the vertical plate 353 are connected to the hinge 354, they are foldable to each other. Therefore, when used as a stroller 1 or a kickboard 3, the saddle frame 350 is separated from the moving structure 300 and completely folded and stored, while at the time of use, it can be spread in a '¬' shape and fixed to the drive frame 330 using a fastening member such as a bolt.

It includes a saddle s coupled to the saddle frame 350 when used as a bicycle 2, and the horizontal plate 352 is formed with a saddle coupling hole for fixing the saddle s. A plurality of saddle coupling holes are formed along the length direction of the horizontal plate 352 so that the saddle s can be arranged and fixed in an appropriate position according to the user's physical condition.

According to an embodiment of the present disclosure, when used as a stroller 1, the footboard f provided on the upper end 343 of the front wheel coupling portion 342 may be used as a saddle s in the three-wheeled bicycle 2. By separating the footrest f coupled to the upper end portion 343 of the front wheel coupling portion 342 and fixing it to the saddle frame 370, it becomes the saddle s of the three-wheeled bicycle 2.

Figure 8:
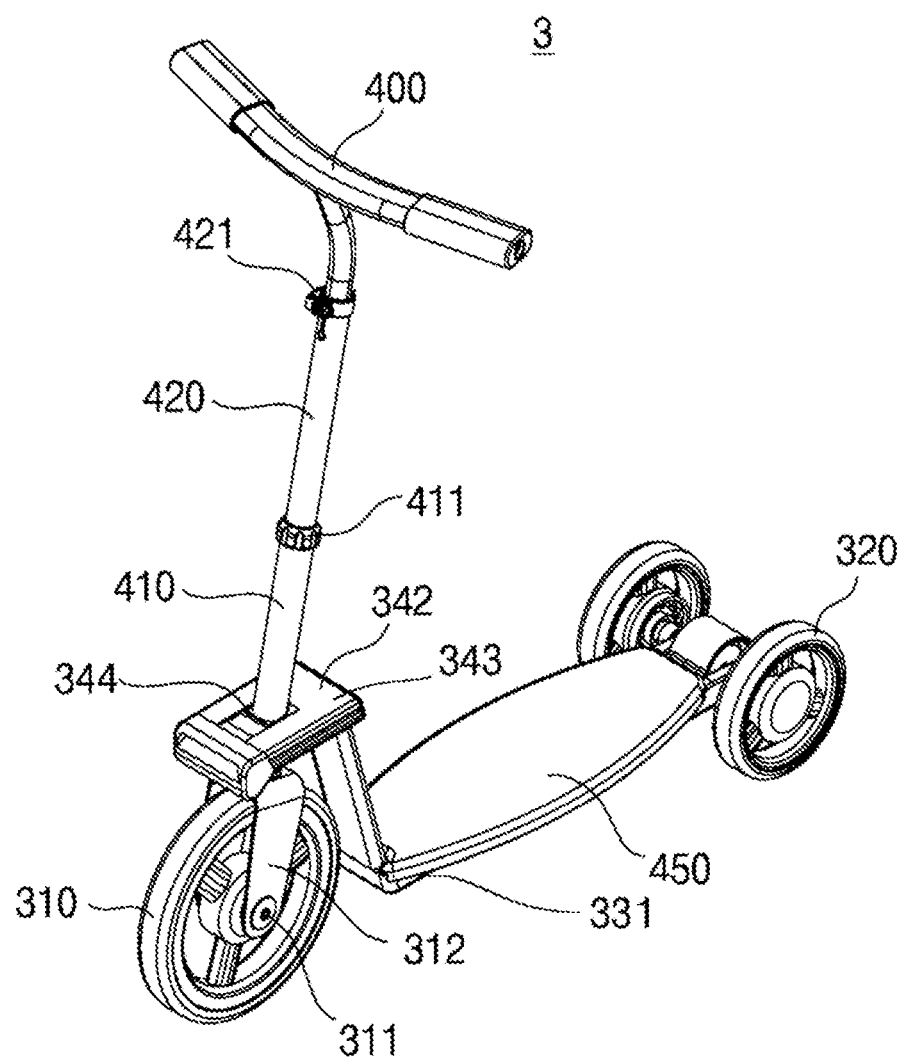
FIG. 8 is a perspective view illustrating a state in which the moving structure of the stroller according to the present disclosure is converted into a kickboard.
Figure 9:
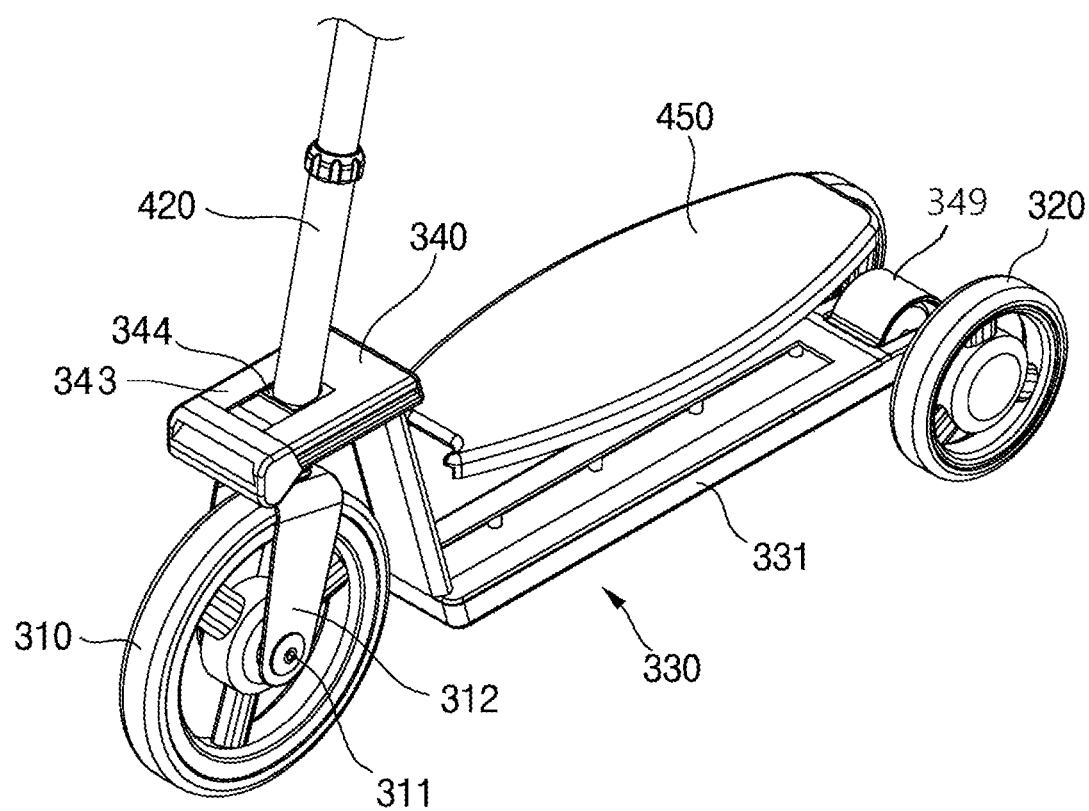
FIG. 9 is an exploded perspective view showing a coupled state of a footboard and a guide frame in the moving structure used as a kickboard according to the present disclosure.
Figure 10:
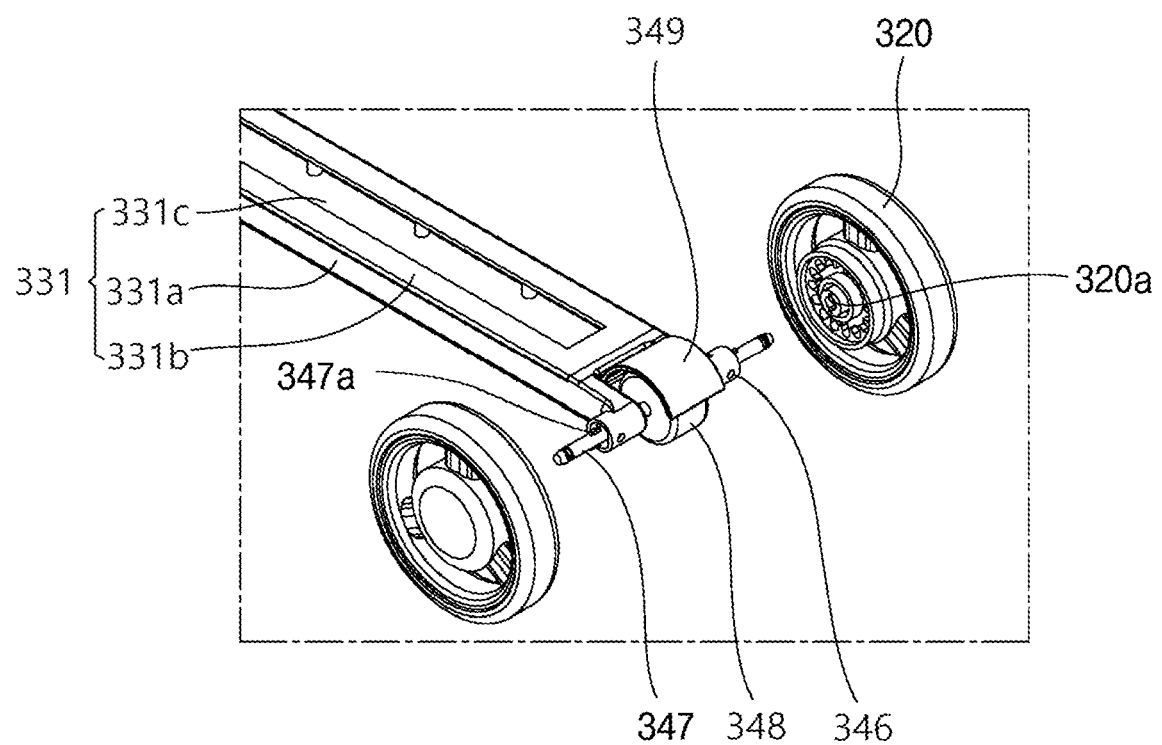
FIG. 10 is an exploded perspective view showing a coupled state of a rear wheel and a first shaft in the moving structure used as a kickboard according to the present disclosure.

FIG. 8 is a perspective view showing a kickboard 3 converted from the stroller 1 according to the present disclosure, FIG. 9 is an exploded perspective view showing a coupling state of the kickboard footboard 450 and the guide frame 331 of the kickboard 3 according to the present disclosure, and FIG. 10 is an exploded perspective view showing a state in which the rear wheels 320 are coupled to the rear wheel coupling portions 345 of the drive frame 330 when used as the kickboard 3 according to the present disclosure.

The process of converting the stroller 1 according to the present disclosure into a kickboard 3 will be described below with reference to FIG. 8.

In order to convert from the stroller 1 shown in FIG. 1 to the kickboard 3, first, the seat portion 100 and the support frame 200 are separated from the moving structure 300. When separating the support frame 200 from the moving structure 300, the roller 332 and the joint portion 333 supporting the second frame 222 so as to be movable with respect to the guide frame 230 may be separated together. The rear wheel coupling shaft 321 is separated from the rear wheel coupling portion 345, and the rear wheel 320 is directly coupled to the coupling shaft portion 346 of the rear wheel coupling portion 345.

The moving structure 300 for the kickboard 2 includes a drive frame 330, a front wheel 310 coupled to the support fork 312 and installed on the front wheel coupling portion 342, and a rear wheel 320 coupled to the rear wheel coupling portion 345. When compared with the moving structure 300 for the stroller 1, it is a state in which the roller 332, the joint portion 333, the rear wheel connecting shaft 321, and the frame connecting mechanism 322 are removed.

As shown in FIG. 8, when trying to convert the moving structure 300 into a kickboard 3 and using it, a handle 400 is coupled to the handle coupling portion 344 provided at the upper end 343 of the front wheel coupling portion 342.

The handle 400 may be coupled to the handle coupling portion 344 in a state in which the steering shafts 410 and 420 are coupled to the lower end. The handle 400 and the steering shafts 410 and 420 are the same as described in the method of converting the stroller 1 into a three-wheeled bicycle 2.

Referring to FIG. 9, on the guide frame 331, the kickboard footboard 450 on which a passenger's feet can be placed may be installed. The guide frame 331 may be inserted and fixed in a groove formed as a lower surface of the kickboard footboard 450.

FIG. 10 is a view for explaining a manner in which the rear wheel 320 is coupled to the rear wheel coupling portion 345 of the drive frame 330 when converting the stroller 1 into the kickboard 3 according to an embodiment of the present disclosure.

The rear wheels 320 are respectively coupled to the first shaft 347 penetrating the coupling shaft portions 346 on both sides of the rear wheel coupling portion 345. At this time, the first shaft 347 located at the central portion of the coupling shaft portion 346 is inserted into the central hole of the rear wheel 320. A coupling key 347a may be formed in the first shaft 347, and a key groove 320a corresponding to the coupling key may be formed in a central hole of the rear wheel 320. The coupling key 347a is fixed to the key groove 325a of the rear wheel 320 so that the rear wheel 320, the first shaft 337, and the brake wheel 348 rotate together.

Therefore, by pushing the pressing plate 349 and applying a braking force to the brake wheel 348, the rear wheel 320 can be braked.

According to an embodiment of the present disclosure, when converting the stroller according to the present disclosure into a kickboard, it is not excluded that the brake wheel 348 directly serves as the rear wheel of the kickboard. In this case, the rear wheels 320 are not coupled.

Figure 11:
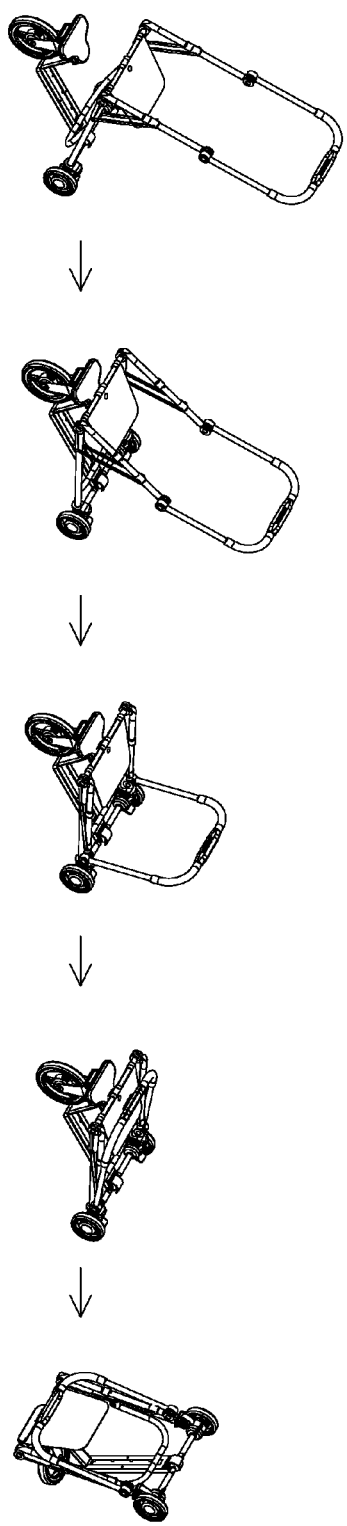
FIG. 11 is a view showing a folding operation sequence of the stroller according to the present disclosure.

FIG. 11 is a view showing a folding operation sequence of the stroller 1 according to the present disclosure. Referring to FIG. 9, the folding operation of the stroller 1 will be described as follows.

In order to show the folding operation of the support frame 200, it is shown in a state in which the seat portion 100 is removed from the stroller 1.

First, the second frame 222 of the lower support frame 220 slidingly moves backward along the guide frame 331. Since the second frame 222 is coupled through the roller 332 and the joint portion 333 installed in the guide frame 331, it is possible to slidingly move backward along the guide frame 331 together with the rollers 332.

At this time, the locking device 232 of the frame support 230 that is supported between the upper support frame 210 and the lower support frame 220 in the support frame 200 and maintains the fixed state is unlocked. When the upper end of the frame support 230 slidingly moves along the upper support frame 210 in the direction of the handle 211 by unlocking the locking device 232 provided on the frame support 230, the upper support frame 210 can be folded with respect to the lower support frame 220 while the hinge part 240 is rotating.

At the same time, the lever 212 of the handle 211 located on the upper support frame 210 is operated so that the divided portion of the upper support frame 210 can be folded by the hinge part 241.

At this time, the handle 211 may be completely folded in the direction in which the upper support frame 210 is folded.

The front wheel 310 is rotated to a predetermined angle, and then the front wheel 310 and the footboard f are utilized as a support so that it can be erected.

In this way, the stroller 1 according to the present disclosure can be easily folded and stored.

The stroller 1 according to the present disclosure optionally separates the support frame 200 on which the seat portion 100 is mounted from the stroller 1, and some components is separated from the moving structure 300, or the position can be changed and some components are additionally assembled, thereby converting a three-wheeled bike 2 or a kickboard 3.

The drive frame 330 of the moving structure 300 may be used in a stroller 1, a three-wheeled bicycle 2, or a kickboard 3. When an infant who used a stroller 1 grows and needs a bicycle 2 or a kickboard 3, the stroller 1 can be used as a three-wheeled bicycle 2 or a kickboard 3 without discarding the whole, so that it is possible to save resources and reduce environmental pollution.

The above description of the present disclosure is for illustrative purposes only, and it will be understood by those of ordinary skill in the art that and it is possible to easily modify it into other concrete forms without changing the technical idea or essential features of the present invention. Therefore, it should be understood that the embodiments described above are illustrative in all respects and not limiting. The scope of the present disclosure is defined by the claims to be described later, and all changes or modifications derived from the meaning and scope of the claims and their equivalent concepts should be construed as being included in the scope of the present disclosure.

DESCRIPTION OF REFERENCE NUMERALS

| | |
|---|---|
| 100: seat portion | 110: seat |
| 120: footboard | |
| 200: support frame | |
| 210: upper support frame | 211: handle |
| 212: lever | |
| 220: lower support frame | 221: first frame |
| 222: second frame | |
| 230: frame support | 232: locking device |
| 240: hinge part | |
| 300: moving structure | 310: front wheel |
| 311: front wheel central axis | 312: support fork |
| 320: rear wheel | |
| 321: rear wheel connecting shaft | |
| 322: frame connecting mechanism | |
| 322a: rear wheel locking portion | |
| 322b: suspension | |
| 325: shaft coupling portion | |
| 330: drive frame | 331: guide frame |
| 331a: first guide portion | 331b: second guide portion |
| 331c: moving guide groove | |
| 332: roller | 333: joint portion |
| 338: second shaft | |
| 342: front wheel coupling portion | 343: upper end portion |
| 344: handle coupling portion | |
| 345: rear wheel coupling portion | |
| 346: coupling shaft portion | 347: first shaft |
| 348: brake wheel | 349: pressing plate |
| 350: saddle frame | 351: coupling flange |
| 352: horizontal plate | 353: vertical plate |
| 354: hinge | 400: handle |
| 410, 420: steering shaft | 450: kickboard footboard |
| f: footboard | s: saddle |

What is claimed is:

1. A stroller comprising:
a seat portion including a seat;
a support frame including an upper support frame supporting the seat, a lower support frame rotatably connected to the upper support frame by a first hinge portion, and a frame support that maintains a fixed state between the upper support frame and the lower support frame; and
a moving structure to which the support frame is detachably connected, the moving structure including
a guide frame that allows a lower support layer to fold and support and is extended in the length direction,
a drive frame including a front wheel coupling portion connected in a '¬' shape to the front part of the guide frame and a rear wheel coupling portion having coupling shaft portions formed on both sides of the rear end of the guide frame,
a front wheel supported by a support fork to be installed on the front wheel coupling portion, and
a rear wheel installed on the rear wheel coupling portion through a rear wheel connecting shaft,
wherein the lower support frame includes a first frame rotatably connected to the upper support frame by the first hinge portion, and a second frame rotatably hinged to the first frame, and
the second frame is slidably mounted on the guide frame and supported to be foldable with respect to the first frame; and
wherein the frame support is installed between the upper support frame and the first frame of the lower support frame, and
a locking device slidably mounted on the upper support frame is provided on an upper end of the frame support, and in response to an unlocking of the locking device, the upper end of the frame support moves along the upper support frame.

2. The stroller according to claim 1, wherein the guide frame includes a moving guide groove to guide:
a first guide portion extending in the length direction and receiving a roller to be movable in the front-rear direction therein, a second guide portion coupled to an upper portion of the first guide portion, and a joint portion having a coupling sleeve to which the second frame of the lower support frame and the roller are coupled.

3. The stroller according to claim 1, wherein the support fork is formed in a module in which the front wheel is coupled, and is detachably coupled to an upper end part of the front wheel coupling portion, and
the support fork includes a pair of support fork portions configured such that a pair of the front wheels are installed thereto, respectively.

4. The stroller according to claim 1, further comprising a frame connecting mechanism which is installed on the rear wheel connecting shaft and to which the first frame of the lower support frame is fixed.

5. The stroller according to claim 4, wherein the frame connecting mechanism includes:
a rear wheel locking portion inserted and installed into the rear wheel connecting shaft and connected to the rear wheel to lock the rear wheel, and a suspension that is formed integrally with the rear wheel locking portion, is coupled to the lower end of the first frame, and supports the first frame in a shock-absorbing manner.

6. The stroller according to claim 1, wherein
the upper support frame is divided into two and foldably connected by a second hinge portion, and a handle provided at an upper end of the upper support frame is provided with a lever for controlling the rotation of the second hinge portion.

7. The stroller according to claim 1, further comprising a handle enabling steering of the support fork, wherein
an upper end portion of the drive frame is provided with a handle coupling portion configured to be coupled to the handle.

8. The stroller according to claim 7, wherein
the moving structure further includes a saddle frame coupled to the drive frame in a state in which the support frame is separated, and a saddle coupled to the saddle frame,
the support fork further includes a footboard connected to a central axis of the front wheel, and
the handle is coupled to the handle coupling portion, and can be used as a three-wheeled bicycle.

9. The stroller according to claim 8, wherein
the saddle frame includes a horizontal plate and a vertical plate hingedly connected to the horizontal plate, and is formed in a form that can be folded and stored when not in use.

10. The stroller according to claim 9, wherein
the handle has a height-adjustable multi-stage steering shaft at a lower end, and a lower end of the steering shaft is coupled to the handle coupling portion.

11. The stroller according to claim 9, wherein
the handle includes a grip portion formed to be adjustable in length at opposite ends, and
a handle fixing portion is formed in the seat portion to allow the handle to be fixed and used as a safety bar.

12. The stroller according to claim 7, wherein
the handle has a height-adjustable multi-stage steering shaft at a lower end, and a lower end of the steering shaft is coupled to the handle coupling portion.

13. A stroller comprising:
a seat portion including a seat;
a support frame including an upper support frame supporting the seat, a lower support frame rotatably connected to the upper support frame by a first hinge portion, and a frame support that maintains a fixed state between the upper support frame and the lower support frame; and
a moving structure to which the support frame is detachably connected, the moving structure including
a guide frame that allows a lower support layer to fold and support and is extended in the length direction,
a drive frame including a front wheel coupling portion connected in a '⌐' shape to the front part of the guide frame and a rear wheel coupling portion having coupling shaft portions formed on both sides of the rear end of the guide frame,
a front wheel supported by a support fork to be installed on the front wheel coupling portion, and
a rear wheel installed on the rear wheel coupling portion through a rear wheel connecting shaft,
wherein
the rear wheel connecting portion includes:
a first shaft extending between the coupling shaft portions, and having opposite ends extending outward through a center of the coupling shaft portion;
a brake wheel rotatably installed on the first shaft; and
a pressing plate hingedly connected to the guide frame, disposed at the upper portion of the brake wheel, and selectively contacting the brake wheel to enable braking of the brake wheel.

14. The stroller according to claim 13, wherein
the rear wheel connecting shaft has a shaft coupling portion integrally coupled with the coupling shaft portion at one side end, and has a second shaft rotating at the other side end, and the rear wheel is coupled to the second shaft.

15. The stroller according to claim 13, wherein
the moving structure is configured such that the rear wheel is directly connected to the rear wheel connecting portion of the drive frame in a state in which the support frame is separated, the rear wheel being installed to rotate together with the first shaft,
the upper end portion of the drive frame is provided with a handle coupling portion to which a handle enabling steering of the support fork can be coupled, and
the handle is coupled to the handle coupling portion, and thus can be used as a kickboard.

16. The stroller according to claim 15, further comprising a kickboard footboard inserted into the guide frame.

17. A stroller comprising:
a seat portion including a seat;
a support frame including an upper support frame supporting the seat, a lower support frame rotatably connected to the upper support frame by a first hinge portion, and a frame support that maintains a fixed state between the upper support frame and the lower support frame; and
a moving structure to which the support frame is detachably connected, the moving structure including
a guide frame that allows a lower support layer to fold and support and is extended in the length direction,
a drive frame including a front wheel coupling portion connected in a '⌐' shape to the front part of the guide frame and a rear wheel coupling portion having coupling shaft portions formed on both sides of the rear end of the guide frame,
a front wheel supported by a support fork to be installed on the front wheel coupling portion, and
a rear wheel installed on the rear wheel coupling portion through a rear wheel connecting shaft,
the stroller further comprising a handle enabling steering of the support fork, wherein
an upper end portion of the drive frame is provided with a handle coupling portion configured to be coupled to the handle,
wherein
the handle includes a grip portion formed to be adjustable in length at opposite ends, and
a handle fixing portion is formed in the seat portion to allow the handle to be fixed and used as a safety bar.

* * * * *